Oct. 6, 1964

A. P. HELDENBRAND 3,151,478

PRESSURE TESTING VESSELS

Filed Nov. 16, 1959

INVENTOR.
ARTHUR P. HELDENBRAND
BY
Jerry J Dunlap
ATTORNEY

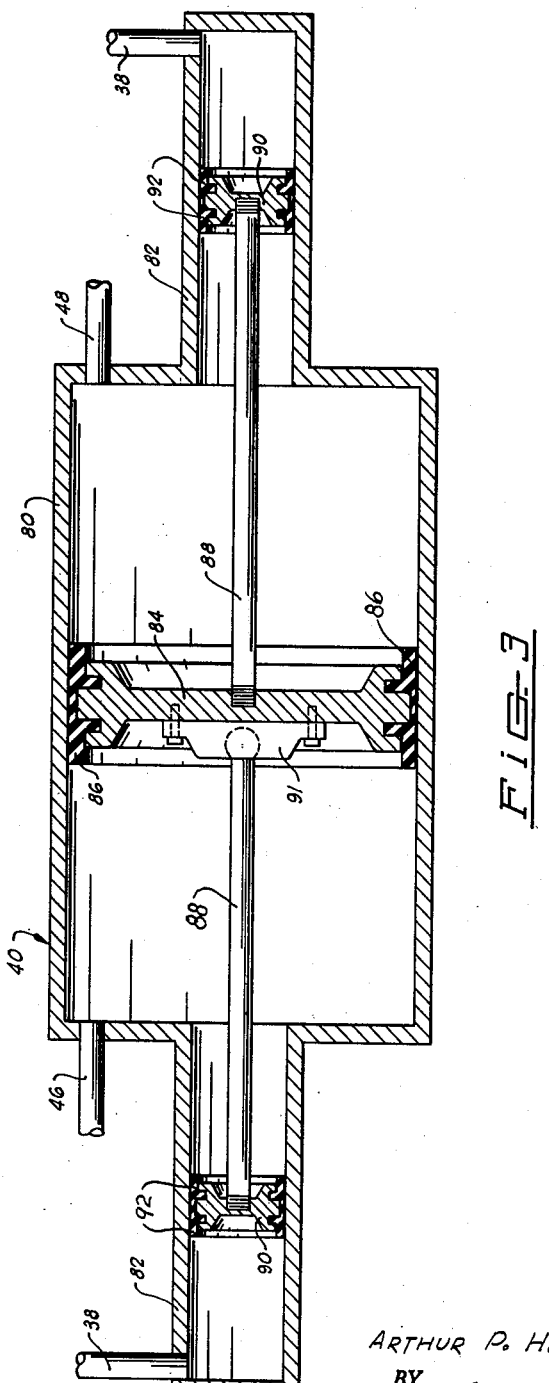

United States Patent Office 3,151,478
Patented Oct. 6, 1964

3,151,478
PRESSURE TESTING VESSELS
Arthur P. Heldenbrand, Box 4132, Oklahoma City, Okla.
Filed Nov. 16, 1959, Ser. No. 853,056
2 Claims. (Cl. 73—49.2)

This invention relates, as indicated, to the art of pressure testing vessels, and more particularly to an improved system and method of pressure testing such items as tubing, drill pipe, process vessel and tanks. For the purpose of this specification and the appended claims, the term "vessel" shall be meant to include all types of tubular members and containers through which fluids are passed or in which fluids are contained under normal operating conditions.

As it is well known in the art, it is a common procedure to periodically pressure test a great variety of different types of vessels to determine their fitness for service. The usual procedure is to pump water into such a vessel by means of a reciprocating type positive displacement pump until the desired test pressure is produced in the vessel. Such a procedure is simple to perform, but has several practical shortcomings. The pumping equipment for producing the desired test pressure is usually expensive, and requires frequent repairs when utilized to pump water which is normally used in the testing process. Also, the testing procedure is normally carried out in the field where the equipment is exposed to all types of weather conditions. In cold weather, the water frequently freezes in the positive displacement pump and requires that the pump be thawed out before it can be placed in operation, after it is idle for any appreciable length of time. Furthermore, when water freezes in a positive displacement pump, it usually damages the packing used in the pump, such that the pump will not produce the maximum pressure.

The present invention contemplates a novel system for pressure testing various types of vessels, wherein the water used in a vessel for the internal testing procedure is pressurized by means of a hydraulic system employing oil as the working fluid, with the oil being placed in direct contact with the test water to produce the desired test pressure. Therefore, the test water never contacts the equipment utilized to generate the test pressure, such that the system will be operable in all weather conditions. Broadly stated, the present invention may be defined as a system for pressure testing a vessel, comprising a water supply; means for filling the vessel with water from the water supply; a pressure transfer chamber; conduit means providing communication between the water supply and one end portion of said chamber and between said one end portion of said chamber and the vessel for the transfer of water from the water supply through said one end portion of said chamber to the vessel; check valves in said conduit means preventing a retrograde flow between the vessel and the water supply; an oil supply; and means for forcing oil under pressure into the opposite end portion of said chamber against water in said chamber and, alternately, sucking oil from said opposite end portion of said chamber, for pumping water from the water supply through said one end portion of said chamber into the vessel and providing the pumped water with a pressure equal to the pressure of the oil.

An important object of this invention is to provide a system and method for pressure testing vessels which will be operable in all weather conditions.

Another object of this invention is to provide a pressure testing system and method utilizing two immiscible working fluids, wherein each fluid is utilized in a portion of the system where its particular qualities are most efficiently employed.

Another object of this invention is to provide a system for pressure testing vessels wherein the test fluid utilized in the vessel is water, and yet the water never comes in contact with the pumping equipment utilized for generating the test pressure.

A further object of this invention is to provide a system for pressure testing vessels wherein oil is utilized as the working fluid in the pumping equipment utilized for generating the test pressure, and yet the fluid introduced into the vessel for the test is water.

Another object of this invention is to provide a novel pressure boosting device particularly useful in a pressure testing system and which will increase the pressure of a working fluid without the requirement for packing glands in the equipment.

Another object of this invention is to provide a novel pressure transfer chamber wherein the pressure of a first liquid may be transferred directly to another liquid which is immiscible with the first liquid while maintaining an efficient separation and minimum mixing of the liquids.

A still further object of this invention is to provide a novel system for pressure testing vessels which is simply constructed, may be economically manufactured, which does not require special skill for its use, and which will have a long service life.

Other objects and advantages of the invention will be evident from the following detailed description, when read in conjunction with the accompanying drawings which illustrate my invention.

In the drawings:

FIGURE 3 is a vertical sectional view taken along the longitudinal centerline of a novel pressure booster preferably employed in my system.

Figures 1, 2:
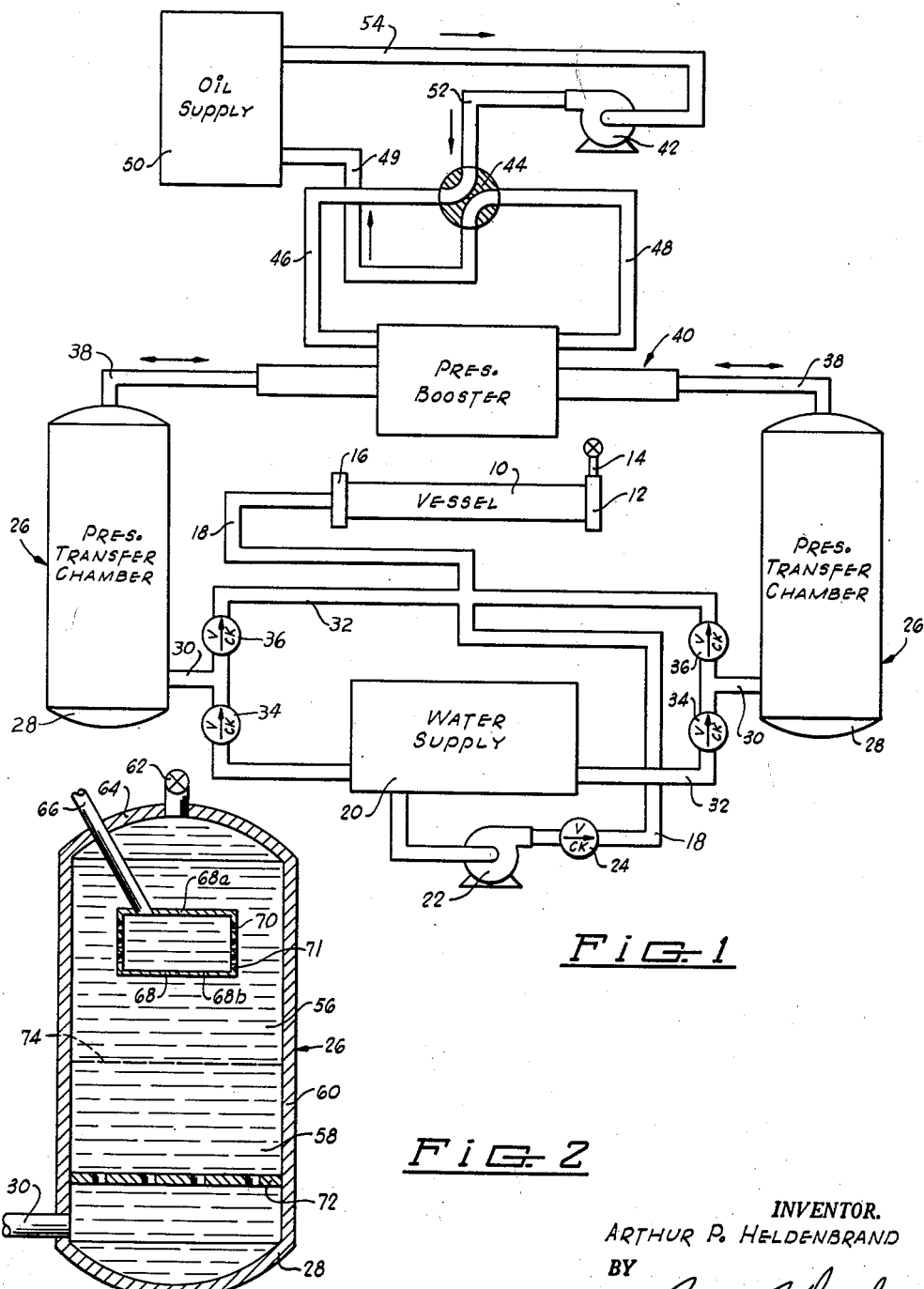
FIGURE 1 is a schematic drawing in the nature of a flow diagram illustrating a complete system embodying my invention.
FIGURE 2 is a vertical sectional view through a preferred pressure transfer chamber utilized in my system.

Referring to the drawings in detail, and particularly FIG. 1, reference character 10 designates the vessel to be pressure tested, which may be in the form of a joint of tubing, a joint of drill pipe, or any process vessel in which liquids are conveyed or contained during normal operating conditions. When the vessel 10 is in the form of a joint of tubing or a joint of drill pipe, a suitable cap 12 is secured on one end of the vessel and is provided with a suitable valved vent 14 in the upper portion thereof, by which air may be removed from the vessel. The opposite end of the vessel 10 is provided with another cap 16 having a conduit 18 suitably connected thereto through which water may be injected into the vessel 10 for the pressure test.

The conduit 18 communicates with a suitable water supply 20 which may be simply in the form of a tank containing a sufficient amount of water for the particular testing operation. A suitable low pressure pump 22 is interposed in the conduit 18 and is utilized to initially fill the vessel 10 with water from the water supply 20, without the generation of any appreciable pressure in the vessel 10, as will be described. The pump 22 may therefore be of any suitable type which is simply constructed, economical and which will not freeze up in adverse weather conditions. It may also be noted that a check valve 24 is interposed in the conduit 18 adjacent the outlet of the pump 22 to prevent a retrograde flow of water through the pump 22 from the vessel 10.

The desired test pressure is created in the vessel 10 by means of a novel pressure system which includes a pair of pressure transfer chambers 26 utilized to transfer the pressure of a body of oil to the water, as will be described in detail below. The lower end portion 28 of each pressure transfer chamber 26 is provided with a connector 30 which is connected to a conduit 32 extending from the water supply 20 into connection with an intermediate portion of the conduit 18 between the check valve 24 and the vessel 10. It will be understood that each connector 30 may be secured to the respective conduit 32 by means of a suitable T fitting, such that water may flow from the water supply 20 through the connector 30 into the lower end portion of the respective pressure transfer chamber 26, and water may flow from the lower end portion 28 of the respective chamber 26 through another portion of the conduit 32 into the conduit 18. Also, a check valve 34 is interposed in the conduit 32 between each connector 30 and the water supply 20, and another check valve 36 is interposed in the conduit 32 between each connector 30 and the connection of the conduit 32 with the conduit 18.

The oil utilized in each pressure transfer chamber 26 to act on the water in the lower end portion 28 of the respective chamber 26 is supplied to the respective chamber and removed from the respective chamber by any suitable pumping means through a conduit 38 connected to the upper end of the chamber. The action of the oil forces water from the lower end portion of the respective chamber through the conduits 32 and 18 to the vessel 10, and, alternately, draws water from the water supply 20 through the conduit 32 into the lower end portion 28 of the respective chamber, as will be described in more detail below. The preferred pumping means for controlling the oil flowing to and from each pressure transfer chamber 26 through the respective conduit 38 comprises a reciprocating type pressure booster 40 energized by a suitable pump 42 and controlled by a four-way valve 44. As will be described in detail below, the pressure booster 40 functions to alternately force oil through each of the conduits 38 and then draw this oil back into the respective end of the pressure booster, with the pressure of the oil being operated upon by the pressure booster 40 being substantially greater than the pressure of oil supplied to the pressure booster from the pump 42.

The pressure booster 40 is connected by two conduits 46 and 48 to the opposite sides of the four-way valve 44, such that oil may be supplied from the pump 42 to the alternate ends of the pressure booster. One of the other outlets of the four-way valve 44 is connected by a conduit 49 to a suitable oil supply 50, and the other opposed outlet is connected by a conduit 52 to the outlet of the pump 42. The inlet of the pump 42 is in turn connected by a conduit 54 to the oil supply 50. It will thus be apparent that the pump 42 may be used to continuously supply oil through the conduit 52 to the four-way valve 44, and this oil may be directed through either the conduit 46 or the conduit 48, depending upon the position of the valve 44. When oil is supplied through the conduit 46, oil is discharged from the pressure booster 40 through the other conduit 48, the control valve 44 and then the conduit 49 to the oil supply 50.

The position of the valve 44 may be shifted in any desired manner, such as manually, to provide the desired operation of the pressure booster 40, or the valve 44 may be suitably connected to the pressure booster 40 to provide an automatic operation, as will be understood by those skilled in the art. It may also be noted here that the pump 42 may be of any desired type which will produce the desired pressure of the oil supplied to the pressure booster 40, since the pump 42 handles only oil and will not be subjected to freezing in adverse weather.

Each of the pressure transfer chambers 26 is preferably constructed as illustrated in FIG. 2 to provide an efficient transfer of pressure from a body of oil 56 in the upper portion of the chamber to a body of water 58 in the lower portion of the chamber. As shown, each chamber 26 comprises a generally cylindrically shaped vertically extending container 60 having a wall thickness sufficient to withstand the maximum test pressures to be produced by the pressure testing system. The connector 30 is suitably secured in the lower end portion 28 of the container 60, and a valved vent 62 is provided in the extreme upper end of the container 60 to remove air from the container 60 when the container is initially filled with the oil and water. It may also be noted that the upper end 64 of the container 60 is preferably dished upwardly to facilitate the venting of air through the valved vent 62, as will be readily understood by those skilled in the art.

A tubular connector 66 extends through the top wall 64 of the container 60 at an angle for connection with the respective conduit 38 extending from the pressure booster 40 as illustrated in FIG. 1. The connector 66 is secured in the top wall 64 of the container 60 in any desired manner to provide a fluid tight seal around the connector, and a baffling device 68 is suitably secured in the container 60 on the lower end of the connector 66. The baffling device 68 preferably comprises a cylindrically-shaped member having solid upper and lower ends 68a and 68b and a plurality of perforations 70 in the side walls 71 thereof. The baffling device 68 serves to evenly disperse oil injected into the chamber through the connector 66, such that a minimum turbulence is provided for the oil. Also, a perforated baffle plate 72 is secured across the interior of the container 60 below the level of the interface 74 provided between the body of oil 56 and the body of water 58, to minimize turbulence in the body of water 58 as the water level is raised and lowered.

In the preferred construction of each chamber 26, as illustrated in FIG. 2, the interface 74 is raised and lowered by the action of the body of oil 56 on the body of water 58 when oil is withdrawn and injected through the connector 66. When oil is injected through the connector 66, the oil is efficiently dispersed through the apertures 70 in the baffling device 68 to provide a minimum turbulence in the oil. It will be apparent that as this oil is injected to increase the quantity in the chamber 26, the pressure of the oil reacts on the body of water 58 through the interface 74 to discharge a portion of the water through the connector 30 and to the vessel 10 as previously indicated. When oil is withdrawn from the chamber 26 through the connector 66, water is drawn into the lower end portion 28 of the chamber through the connector 30 from the water supply 20, and the minimum turbulence is provided in the body of water 58 by the action of the baffle 72. It will therefore be apparent that each chamber 26 acts in the nature of a pump utilizing oil as the working fluid and water as the fluid being acted on, but without the use of a piston between the two fluids. Since the minimum turbulence is provided for both the oil and water in each pressure transfer chamber 26, the respective interface 74 will remain definite and a minimum mixing of the liquids will occur. It may also be noted that since the water has a greater density than the oil, and since the water is maintained in the lower end portion 28 of the respective chamber 26, the oil will tend to remain in the upper portion of the chamber. Furthermore, it should be noted that the relative capacities of the transfer chambers 26 and the pressure booster 40 is such that oil constantly remains in the upper portion of each pressure transfer chamber 26 throughout a testing operation. In other words, the pressure booster 40 never removes all of the oil from either chamber 26 during a testing operation.

As shown in FIG. 3, the pressure booster 40 comprises an elongated tubular housing 80 having tubular extensions 82 of decreased diameter on the opposite ends thereof. It may also be noted that unrestricted communication is provided between each end of the housing 80 and the respective extension 82. It will be understood that the extensions 82 may be formed separately from the housing 80 and suitably connected to the respective ends of the housing 80 in aligned relation, or the extensions 82 may be cast integrally with the housing 80. A large piston 84 is positioned in the housing 80 and is provided with oppositely facing cups 86 around the outer periphery thereof to slidingly seal the piston 84 in the housing 80 and prevent any appreciable leakage of fluid around the piston 84 when high pressure fluid is introduced into either end of the housing 80.

A piston rod 88 extends from each side of the large piston 84 into the respective housing extension 82 and into connection with a smaller piston 90 slidingly disposed in the respective housing extension. It should also be noted that a ball and socket joint 91 is preferably used to connect the piston rod 88 to one side of the larger piston 84 to accomodate slight variations in the alignment of the extensions 82 with the main housing 80. Each of the smaller pistons 90 is also provided with oppositely facing cups 92 to slidingly seal the respective piston in the respective housing extension and prevent any appreciable leakage of fluid around the piston when high pressure fluid is present in either end of the respective housing extension. The conduits 38 are suitably connected to the outer ends of the housing extensions 82, and the conduits 46 and 48 are suitably connected to the opposite ends of the housing 80. The conduits 38 are preferably connected to the tops of the extensions 82 to facilitate the purging of air from the pressure booster 40, particularly when the system is first placed in operation.

As previously indicated, oil is supplied by the pump 42 alternately through the conduits 46 and 48 by action of the four-way valve 44. Also, oil is present in the outer end portion of each housing extension 82 and the respective conduit 38 for operation of the pressure transfer chambers 26. When high pressure oil is supplied through the conduit 46, this oil reacts on the respective face of the large piston 84, as well as on the respective face of the adjacent smaller piston 90. However, since the piston 84 is substantially larger than the respective small piston 90, the net force on the piston rod 88 will be in a direction to move the piston rod 88 to the right, as viewed in FIG. 3. As a result, a portion of the oil in the housing 80 to the right of the piston 84 is exhausted through the conduit 48, valve 44, and conduit 49 to the oil supply 50. Simultaneously, the oil in the outer end of the housing extension 82 at the right hand end of the pressure booster 40 will be forced through the respective conduit 38 into the upper end portion of the respective pressure transfer chamber 26. Furthermore, the oil in the outer end of the right hand end extension 82 will be increased in pressure an amount corresponding to the ratio of the sizes of the piston 84 and pistons 90 (when the system is full of oil and water) to provide the desired amount of pressure in the oil being injected into the respective pressure transfer chamber 26. It will be understood that as oil is forced through one of the conduits 38 into the respective pressure chamber 26, oil is drawn through the other conduit 38 from the other pressure transfer chamber 26 into the opposite end of the pressure booster 40.

When the four-way valve 44 is shifted to direct oil from the pump 42 through the conduit 48, the piston 84 will be moved to the left to exhaust oil through the conduit 46 and increase the pressure of oil in the extreme left hand end of the pressure booster 40. Thus, the pressure booster 40 will provide a reciprocating motion to alternately inject high pressure oil into the pressure transfer chambers 26, with the pressure of this oil being substantially greater than the pressure of the oil supplied to the pressure booster by the pump 42.

To summarize the operation of the complete pressure testing system of this invention, it will be apparent that the vessel 10 is first filled with water from the water supply 20 by action of the low pressure pump 22. When the vessel 10 is filled with water, the operation of the pump 22 is stopped, and the operation of the pump 42 is started. Assuming the four-way valve 44 is in the position shown in FIG. 1, the oil supplied by the pump 42 will be directed to the left hand end of the pressure booster 40 to increase the pressure of the oil in the upper portion of the right hand pressure transfer chamber 26. This increase in pressure forces water from the lower end portion 28 of the respective chamber 26 through the connector 30, conduit 32 and conduit 18 into the vessel 10.

When the stroke of the pressure booster 40 is completed, the four-way valve 44 is shifted to provide communication between the conduit 52 and the conduit 48. The oil supplied by the pump 42 will then operate the pressure booster 40 in an opposite direction to increase the pressure of the oil in the upper end portion of the left hand pressure transfer chamber 26. This increase in pressure in turn forces water from the lower end portion 28 of the respective chamber into the vessel 10 to provide a further increase in pressure of the test water. The check valves 34 and 36 function to prevent a retrograde flow of the test water from the vessel 10 toward the water supply 20, such that when oil is removed from the upper end portion of each pressure transfer chamber 26, a quantity of water will be drawn from the water supply 20 through the respective conduit 32 into the lower end portion 28 of the respective pressure transfer chamber 26. It will be understood that each pressure transfer chamber 26 is air-tight to provide this drawing or sucking action. Therefore, the pressure of the test water in the vessel 10 is increased to the desired amount in a minimum of time, and when this desired test pressure is reached, the pump 42 may be stopped. At the completion of the test, the water in the vessel 10 may be drained either onto the ground at the test site or back into the water supply 20 for use in a subsequent testing operation.

From the foregoing, it will be apparent that the present invention provides a novel system for pressure testing vessels which may be utilized in any weather conditions. The working fluid utilized in the pumping mechanism for producing the test pressure in the vessel is in the form of oil, such that the pumping equipment will not freeze during adverse weather conditions, and this equipment will have a maximum service life. The pressure transfer chambers provide an efficient transfer of pressure from the working fluid to the test fluid without the necessity of utilizing a mechanical transfer of forces, and with a minimum intermixing of the oil and water. Furthermore, it will be apparent that the present invention provides a novel pressure boosting device which will efficiently increase the pressure of a working fluid without the requirement for packing glands and the like to separate the fluids in the device. Finally, it will be apparent that the present invention provides a novel system for pressure testing vessels which is simple in construction, may be economically manufactured, will have a long service life and which requires no special skill for its use.

Changes may be made in the combination and arrangement of parts or elements, as well as in steps or procedures, as heretofore set forth in the specification and shown in the drawings, it being understood that changes may be made in the precise embodiment disclosed without departing from the spirit and scope of the invention as defined in the following claims.

I claim:

1. A system for pressure testing a vessel, comprising a water supply, means for filling the vessel with water from the water supply, an air-tight cylindrically shaped pressure transfer chamber having an upper end and a lower end, conduit means providing communication between the vessel and the lower end portion of the transfer chamber, water in said conduit means and partially filling the transfer chamber, a body of oil in the transfer chamber on top of the water therein and cooperating with the water in completely filling the transfer chamber with oil and water, a pressure vacuum pump unit for withdrawing oil from the upper end of the transfer chamber by the application of suction thereto and, alternately, pumping oil into the upper end of the transfer chamber to control the pressure of the water in the vessel being tested, a check valve in said conduit means preventing flow of water from the vessel being tested to the pressure transfer chamber, a second conduit providing communication between the water supply and the lower end portion of the transfer chamber, a check valve in the second conduit preventing flow of water from the transfer chamber to the water supply, whereby the water in the pressure transfer chamber is re-supplied from the water supply when oil is withdrawn from the upper end of the pressure transfer chamber, conduit means connected to the pressure vacuum pump unit and extending into the upper portion of the pressure transfer chamber, and an apertured baffle device secured to the end of said conduit means within the upper portion of the pressure chamber to minimize turbulence when the oil enters the pressure transfer chamber under pressure.

2. A system for pressure-testing a vessel, comprising a water supply, means for filling the vessel with water from the water supply, an air-tight pressure transfer chamber having an upper end and a lower end, conduit means providing communication between the vessel and the lower end portion of the transfer chamber, water in said conduit means and partially filling the transfer chamber, a body of oil in the transfer chamber on top of the water therein and cooperating with the water in completely filling the transfer chamber with oil and water, means for withdrawing oil from the upper end of the transfer chamber and, alternately, pumping oil into the upper end of the transfer chamber to control the pressure of the water in the vessel being tested, a tubular connector secured in the upper end portion of the pressure transfer chamber and extending downwardly into the chamber for pumping and withdrawing oil into and from the chamber therethrough, and a vertically extending tubular-shaped baffle device on the lower end of said connector to receive oil pumped into the chamber, said baffle device having closed upper and lower ends and perforated side walls to distribute oil pumped into the chamber.

References Cited in the file of this patent

UNITED STATES PATENTS

| | | |
|---|---|---|
| 1,308,515 | Wallace et al. | July 1, 1919 |
| 1,656,911 | Eisenhaver | Jan. 24, 1928 |
| 2,169,703 | Mason | Aug. 15, 1939 |
| 2,249,901 | Kodal | July 22, 1941 |
| 2,416,317 | Hoffar | Feb. 25, 1947 |
| 2,460,836 | Lovins | Feb. 8, 1949 |
| 2,652,717 | Bush et al. | Sept. 22, 1953 |
| 2,704,034 | Jones | Mar. 15, 1955 |
| 2,895,328 | Payne et al. | July 21, 1959 |

FOREIGN PATENTS

| | | |
|---|---|---|
| 370,334 | Great Britain | Apr. 7, 1932 |